United States Patent
Shehab

(10) Patent No.: US 12,288,134 B2
(45) Date of Patent: Apr. 29, 2025

(54) QUANTUM APPROXIMATE CHAOS OPTIMIZATION FOR USE IN A HYBRID COMPUTING SYSTEM

(71) Applicant: IONQ, INC., College Park, MD (US)

(72) Inventor: Omar Shehab, Hyattsville, MD (US)

(73) Assignee: IONQ, INC., College Park, MD (US)

(*) Notice: Subject to any disclaimer, the term of this patent is extended or adjusted under 35 U.S.C. 154(b) by 921 days.

(21) Appl. No.: 16/993,024

(22) Filed: Aug. 13, 2020

(65) Prior Publication Data

US 2021/0056455 A1 Feb. 25, 2021

Related U.S. Application Data

(60) Provisional application No. 62/890,413, filed on Aug. 22, 2019.

(51) Int. Cl.
*G06N 10/60* (2022.01)
*G06F 9/4401* (2018.01)
*G06N 10/40* (2022.01)

(52) U.S. Cl.
CPC .......... *G06N 10/60* (2022.01); *G06F 9/4403* (2013.01); *G06N 10/40* (2022.01)

(58) Field of Classification Search
CPC ................... G06N 10/00–80; G06F 9/4403
See application file for complete search history.

(56) References Cited

U.S. PATENT DOCUMENTS

| | | | |
|---|---|---|---|
| 8,633,437 B2 | 1/2014 | Dantus et al. | |
| 9,335,606 B2 | 5/2016 | Hanson et al. | |
| 9,858,531 B1 | 1/2018 | Monroe et al. | |
| 2006/0249670 A1 | 11/2006 | Monroe et al. | |
| 2009/0213444 A1 | 8/2009 | Goto et al. | |
| 2018/0114138 A1 | 4/2018 | Monroe et al. | |
| 2020/0057957 A1* | 2/2020 | Johnson | G06N 10/20 |

OTHER PUBLICATIONS

Caponetto, Riccardo, et al. "Chaotic sequences to improve the performance of evolutionary algorithms." IEEE transactions on evolutionary computation 7.3 (2003): 289-304. (Year: 2003).*

(Continued)

*Primary Examiner* — Markus A. Vasquez
(74) *Attorney, Agent, or Firm* — Patterson + Sheridan, LLP

(57) ABSTRACT

Embodiments described herein are generally related to a method and a system for performing a computation using a hybrid quantum-classical computing system, and, more specifically, to providing an approximate solution to a combinatorial optimization problem using a hybrid quantum-classical computing system that includes a group of trapped ions. A hybrid quantum-classical computing system that is able to provide a solution to a combinatorial optimization problem may include a classical computer, a system controller, and a quantum processor. The methods and systems described herein include an efficient method for an optimization routine executed by the classical computer in solving a problem in a hybrid quantum-classical computing system, which can provide improvement over the conventional method for an optimization by conventional stochastic optimization methods.

9 Claims, 7 Drawing Sheets

(56) References Cited

OTHER PUBLICATIONS

Häffner, Hartmut, Christian F. Roos, and Rainer Blatt. "Quantum computing with trapped ions." Physics reports 469.4 (2008): 155-203. (Year: 2008).*
Moll, Nikolaj, et al. "Quantum optimization using variational algorithms on near-term quantum devices." Quantum Science and Technology 3.3 (2018): 030503. (Year: 2018).*
Wikipedia. Trapped ion quantum computer. Article dated Jul. 26, 2019. https://en.wikipedia.org/w/index.php?title=Trapped_ion_quantum_computer&oldid=907970380. Accessed Jun. 10, 2023. (Year: 2019).*
Farhang Haddadfarshi et al. "High Fidelity Quantum Gates of Trapped Ions in the Presence of Motional Heating", New Journal of Physics, vol. 18, No. 12, Dec. 2, 2016, p. 123007, XP055722925.
International Search Report dated Sep. 4, 2020 for Application No. PCT/US2020/034008.
G.-D. Lin et al., Large-scale quantum computation in an anharmonic linear ion trap. Europhysics Letters, 86, 60004 (2009).
Yukai Wu, Noise Analysis for High-Fidelity Quantum Entangling Gates in an Anharmonic Linear Paul Trap. Physical Review A 97, 062325 (2018).
T. Choi et al., Optimal Quantum Control of Multimode Couplings between Trapped Ion Qubits for Scalable Entanglement. Physical Review Letters 112, 190502 (2014).
A. Sorensen, K. Molmer, Quantum computation with ions in thermal motion. Physical Review Letters 82, 1971-1974 (1999).
K. Molmer, A. Sorensen, Multiparticle entanglement of hot trapped ions. Physical Review Letters 82, 1835-1838 (1999).
S.-L. Zhu, C. Monroe, L.-M. Duan, Arbitrary-speed quantum gates within large ion crystals through minimum control of laser beams. Europhysics Letters 73, 485-491 (2006).
K. Wright et al., Benchmarking an 11-qubit quantum computer. arXiv:1903.08181 [quant-ph] (2019).
S. Debnath, N. M. Linke, C. Figgatt, K. A. Landsman, K. Wright, C. Monroe, Demonstration of a small programmable quantum computer with atomic qubits. Nature 536, 63-66 (2016).
N. M. Linke, D. Maslov, M. Roetteler, S. Debnath, C. Figgatt, K. A. Landsman, K. Wright, C. Monroe, Experimental comparison of two quantum computing architectures. Proc. Natl. Acad. Sci. U.S.A. 114, 3305-3310 (2017).
Shi-Liang Zhu, C. Monroe, and L.-M. Duan, Trapped Ion Quantum Computation with Transverse Phonon Modes. Physical Review Letters 97, 050505 (2006).
A. W. Harrow, A. Hassidim, S. Llyod, Quantum algorithm for solving linear systems of equations. Physical Review Letters 15, 150502 (2009).
M. Benedetti, D. Garcia-Pintos, O. Perdomo, V. Leyton-Ortega, Y. Nam, A. Perdomo-Ortiz, A generative modeling approach for benchmarking and training shallow quantum circuits. arXiv:1801.07686 [quant-ph] (2018).
P. W. Shor, Polynomial-time algorithms for prime factorization and discrete logarithms on a quantum computer. SIAM Rev. 41, 303-332 (1999).
M. Reiher, N. Wiebe, K. M. Svore, D.Wecker, M. Troyer, Elucidating reaction mechanisms on quantum computers. Proc. Natl. Acad. Sci. U.S.A. 114, 7555-7560 (2017).
Y. Nam and D. Maslov, Low cost quantum circuits for classically intractable instances of the Hamiltonian dynamics simulation problem. arXiv:1805.04645 [quant-ph] (2018).
S. Lloyd, M. Mohseni, P. Rebentrost, Quantum principal component analysis. Nature Physics 10, 631 (2014).
R. Orus, S. Mugel, E. Lizaso, Quantum computing for finance: overview and prospects. arXiv:1807.03890 [quant-ph] (2019).
E. Hewitt, R. E. Hewitt, The Gibbs-Wilbraham phenomenon: An episode in Fourier analysis, Archive for History of Exact Sciences 21, 129-160 (1979).
M. A. Nielsen, I. L. Chuang, Quantum Computation and Quantum Information (Cambridge Univ. Press, New York, NY, 2000).

Y.Wu, S.-T.Wang, L.-M. Duan, Noise Analysis for High-Fidelity Quantum Entangling Gates in an Anharmonic Linear Paul Trap. Physical Review A 97, 062325 (2018).
C. Marquet, F. Schmidt-Kaler, D. F. V. James, Phononphonon interactions due to non-linear effects in a linear ion trap. Applied Physics B 76, 199-208 (2003).
D. J. Wineland, C. Monroe, W. M. Itano, D. Leibfried, B. E. King, D. M. Meekhof, Experimental Issues in Coherent Quantum-State Manipulation of Trapped Atomic Ions. J. Res. Natl. Inst. Stand. Technol. 103, 259-328 (1998).
J. P. Gaebler, T. R. Tan, Y. Lin, Y. Wan, R. Bowler, A. C. Keith, S. Glancy, K. Coakley, E. Knill, D. Leibfried, D. J. Wineland, High-Fidelity Universal Gate Set for 9Be+ ion qubits. Physical Review Letters 117, 060505 (2016).
C. J. Ballance, T. P. Harty, N. M. Linke, M. A. Sepiol, D. M. Lucas, High-Fidelity Quantum Logic Gates Using Trapped-Ion Hyperfine Qubits. Physical Review Letters 117, 060504 (2016).
T. P. Harty, D. T. C. Allcock, C. J. Ballance, L. Guidoni, H. A. Janacek, N. M. Linke, D. N. Stacey, D. M. Lucas, High-delity preparation, gates, memory, and readout of a trapped-ion quantum bit. Physical Review Letters 113, 220501 (2014).
P. H. Leung, K. A. Landsman, C. Figgatt, N. M. Linke, C. Monroe, K. R. Brown, Robust 2-qubit gates in a linear ion crystal using a frequency-modulated driving force. Physical Review Letters 120, 020501 (2018).
T. J. Green, M. J. Biercuk, Phase-modulated decoupling and error suppression in qubit-oscillator systems. Physical Review Letters 114, 120502 (2015).
Y. Nam et al., Ground-state energy estimation of the water molecule on a trapped ion quantum computer. arXiv:1902.10171 [quant-ph] (2019).
G. E. Crooks, Performance of the quantum approximate optimization algorithm on the maximum cut problem. arXiv:1811.08419 [quant-ph] (2018).
Y. Nam, Y. Su, D. Maslov, Approximate quantum Fourier transform with O(n log(n)) T gates. arXiv:1803.04933 [quant-ph] (2018).
T. G. Draper, S. A. Kutin, E. M. Rains, K. M. Svore, A logarithmic-depth quantum carry-lookahead adder. Quant. Inf. Comp. 6, 351-369 (2006).
R. Babbush et al., Encoding electronic spectra in quantum circuits with linear T complexity. Physical Review X 8, 041015 (2018).
L. K. Grover, Quantum mechanics helps in searching for a needle in a haystack. Physical Review Letters 79, 325 (1997).
S. Bravyi, J. Haah, Magic state distillation with low overhead. Physical Review A 86, 052329 (2012).
J. O'Gorman, E. T. Campbell, Quantum computation with realistic magic state factories. Physical Review A 95, 032338 (2017).
F. A. Aloul, A. Ramani, I. L. Markov, K. A. Sakallah, Solving difficult SAT instances in the presence of symmetry. Proc. Des. Automat. Conf. 731-736 (2002).
C. Figgatt, A. Ostrander, N. M. Linke, K. A. Landsman, D. Zhu, D. Maslov, C. Monroe, Parallel entangling operations on a universal ion trap quantum computer. arXiv:1810.11948 [quant-ph] (2018).
Y. Lu, S. Zhang, K. Zhang, W. Chen, Y. Shen, J. Zhang, J.-N. Zhang, K. Kim, Scalable global entangling gates on arbitrary ion qubits. arXiv:1901.03508 [quant-ph] (2019).
N. Grzesiak, R. Blümel, K. Beck, K. Wright, V. Chaplin, J. Amini, N. Pisenti, S. Debnath, J.-S. Chen, Y. Nam, Efficient arbitrary simultaneously entangling gates on a trapped-ion quantum computer. Nature Communications 11, 2963 (2020).
J. T. Merrill, K. R. Brown, Progress in compensating pulse sequences for quantum computation. arXiv:1203.6392 [quant-ph] (2012).
M. X. Goemans, D. P. Williamson, Improved approximation algorithms for maximum cut and satisfability problems using Semidefinite Programming. J. ACM 42, 1115-1145 (1995).
A. M. Childs, D. Maslov, Y. Nam, N. J Ross, Y. Su, Toward the first quantum simulation with quantum speedup. Proc. Natl. Acad. Sci. U.S.A. 115, 9456-9461 (2018).
V. V. Shende, I. L. Markov, S. S. Bullock, Minimal universal two-qubit controlled-NOT-based circuits. Physical Review A 69, 062321 (2004).
D. Maslov, Advantages of using relative-phase Toffoli gates with an application to multiple control Toffoli optimization. Physical Review A 93, 022311 (2016).

(56) References Cited

OTHER PUBLICATIONS

International Search Report dated May 29, 2020 for Application PCT/US2020/015232.
Pak Hong Leung et al., Entangling an Arbitrary Prior of Qubits in a Long Ion Crystal. arXiv:1808.02555 [quant-ph] (2018).
G. M. Amdahl, Validity of the single processor approach to achieving large scale computing capabilities. AFIPS Conf. Proc. 30, 483-485 (1967).
R. P. Feynman, Simulating physics with computers. Int. J. Theor. Phys. 21, 467-488 (1982).
Y. Wang, M. Um, J. Zhang, S. An, M. Lyu, J.-N. Zhang, L.-M. Duan, D. Yum, K. Kim, Single-qubit quantum memory exceeding ten-minute coherence time. Nature Photon 11, 646-650 (2017).
A. Spörl, T. Schulte-Herbrüggen, S. J. Glaser, V. Bergholm, M. J. Storcz, J. Ferber, F. K. Wilhelm, Optimal control of coupled Josephson qubits. Physical Review A75, 012302 (2007).
D. Maslov, Y. S. Nam, J. Kim, An outlook for quantum computing, Proc. IEEE, 107, 5-10 (2019).
Y. Nam, D. Maslov, Low cost quantum circuits for classically intractable instances of the Hamiltonian dynamics simulation problem. arXiv:1805.04645 [quant-ph] (2018).
J. M. Gambetta, F. Motzoi, S. T. Merkel, F. K. Wilhelm, Analytic control methods for high-fidelity unitary operations in a weakly nonlinear oscillator. Physical Review A 83, 012308 (2011).
S. Boyd, L. Vandenberghe, Convex Optimization, (Cambridge Press, New York, NY, 2004).
S. Beauregard, Circuit for Shor's algorithm using 2n+3 qubits. Quant. Inf. Comp. 3, 175-185 (2003).
D. Maslov, Y. Nam, Use of global interactions in efficient quantum circuit constructions. New J. Phys. 20, 033018 (2018).
E. Bernstein, U. Vazirani, Quantum complexity theory. SIAM J. Comput. 26, 1411-1473 (1997).
W. van Dam, S. Hallgren, L. Ip, Quantum algorithms for some hidden shift problems. SIAM J. Comput. 36, 763-778 (2006).
F. A. Calderon-Vargas, G. S. Barron, X.-H. Deng, A. J. Sigillito, E. Barnes, S. E. Economou, Fast high-fidelity entangling gates in Si double quantum dots. arXiv:1902.02350 [quant-ph] (2019).
L. S. Theis, F. Motzoi, F. K. Wilhelm, M. Saman, High-fidelity Rydberg-blockade entangling gate using shaped, analytic pulses. Physical Review A 94, 032306 (2016).
M. M. Müller, H. R. Haakh, T. Calarco, C. P. Koch, C. Henkel, Prospects for fast Rydberg gates on an atom chip. Quant. Inf. Process. 10, 771792 (2011).
International Search Report dated May 28, 2020 for Application No. PCT/US2020/015234.
International Search Report dated May 28, 2020 for Application No. PCT/US2020/015235.
Bravyi, S. B., Landau, L. D., Kitaev, A. Y. (2002). Fermionic quantum computation. Annals of Physics, 298(1), 210-226. https://doi.org/10.1006/aphy.2002.6254.
Colless, J. I., Ramasesh, V. v., Dahlen, D., Blok, M. S., Kimchi-Schwartz, M. E., McClean, J. R., Carter, J., de Jong, W. A., Siddiqi, I. (2018). Computation of Molecular Spectra on a Quantum Processor with an Error-Resilient Algorithm. Physical Review X, 8(1), 011021. https://doi.org/10.1103/PhysRevX.8.011021.
Cormen, T. H., Leiserson, C. E., Rivest, R. L., Clifford Stein. (2009). Introduction to algorithms. MIT press. (Cormen et al., 2009).
Dobšiček, M., Johansson, G., Shumeiko, V., Wendin, G. (2007). Arbitrary accuracy iterative phase estimation algorithm as a two qubit benchmark. Physical Review A, 76(3), 030306. https://doi.org/10.1103/PhysRevA.76.030306.
Dumitrescu, E. F., McCaskey, A. J., Hagen, G., Jansen, G. R., Morris, T. D., Papenbrock, T., Pooser, R. C., Dean, D. J., Lougovski, P. (2018). Cloud Quantum Computing of an Atomic Nucleus. Physical Review Letters, 120(21), 210501. https://doi.org/10.1103/PhysRevLett.120.210501.
Evenbly, G., Vidal, G. (2007). Algorithms for entanglement renormalization. Physical Review B, 79(14), 144108. https://doi.org/10.1103/PhysRevB.79.144108.
Farhi, E., Goldstone, J., Gutmann, S. (2014). A Quantum Approximate Optimization Algorithm. ArXiv:1411.4028 [Quant-Ph]. http://arxiv.org/abs/1411.4028.
Figgatt, C. M. (2018). Building and Programming a Universal Ion Trap Quantum Computer. http://iontrap.umd.edu/wp-content/uploads/2013/10/FiggattThesis.pdf.
Hadfield, S., Papageorgiou, A. (2018). Divide and conquer approach to quantum Hamiltonian simulation. New Journal of Physics, 20(4), 043003. https://doi.org/10.1088/1367-2630/aab1ef.
Jones, N. C., Whitfield, J. D., McMahon, P. L., Yung, M. H., Meter, R. van, Aspuru-Guzik, A., Yamamoto, Y. (2012). Faster quantum chemistry simulation on fault-tolerant quantum computers. New Journal of Physics, 14, 115023. https://doi.org/10.1088/1367-2630/14/11/115023.
Kandala, A., Mezzacapo, A., Temme, K., Takita, M., Brink, M., Chow, J. M., Gambetta, J. M. (2017). Hardware-efficient Variational Quantum Eigensolver for Small Molecules and Quantum Magnets. Nature, 549, 242-246. https://doi.org/10.1038/nature23879.
Maslov, D. (2017). Basic circuit compilation techniques for an ion-trap quantum machine. New Journal of Physics, 19(2), 023035. https://doi.org/10.1088/1367-2630/aa5e47.
McArdle, S., Yuan, X., Benjamin, S. (2019). Error-mitigated digital quantum simulation. Physical Review Letters, 122 (18), 180501. https://doi.org/10.1103/PhysRevLett.122.180501.
McClean, J. R., Boixo, S., Smelyanskiy, V. N., Babbush, R., Neven, H. (2018). Barren plateaus in quantum neural network training landscapes. Nature Communications, 9, 4812. https://doi.org/10.1038/s41467-018-07090-4.
McClean, J. R., Schwartz, M. E., Carter, J., de Jong, W. A. (2017). Hybrid Quantum-Classical Hierarchy for Mitigation of Decoherence and Determination of Excited States. Physical Review A, 95(4), 042308. https://doi.org/10.1103/PhysRevA.95.042308.
Peruzzo, A., McClean, J., Shadbolt, P., Yung, M. H., Zhou, X. Q., Love, P. J., Aspuru-Guzik, A., OBrien, J. L. (2014). A variational eigenvalue solver on a photonic quantum processor. Nature Communications, 5, 4213. https://doi.org/10.1038/ncomms5213.
Shantanu, D. (2016). A Programmable Five Qubit Quantum Computer Using Trapped Atomic Ions.
Takeshita, T., Rubin, N. C., Jiang, Z., Lee, E., Babbush, R., McClean, J. R. (2020). Increasing the representation accuracy of quantum simulations of chemistry without extra quantum resources. Physical Review X, 10(1), 011004. https://doi.org/10.1103/PhysRevX.10.011004.
Wecker, D., Bauer, B., Clark, B. K., Hastings, M. B., Troyer, M. (2014). Gate count estimates for performing quantum chemistry on small quantum computers. Physical Review A, 90(2), 022305. https://doi.org/10.1103/PhysRevA.90.022305.
Welch, J., Greenbaum, D., Mostame, S., Aspuru-Guzik, A. (2014). Efficient quantum circuits for diagonal unitaries without ancillas. New Journal of Physics, 16, 033040. https://doi.org/10.1088/1367-2630/16/3/033040.

* cited by examiner

QUANTUM APPROXIMATE CHAOS OPTIMIZATION FOR USE IN A HYBRID COMPUTING SYSTEM

CROSS-REFERENCE TO RELATED APPLICATIONS

This application claims the benefit to U.S. Provisional Application No. 62/890,413, filed Aug. 22, 2019, which is incorporated by reference herein.

BACKGROUND

Field

The present disclosure generally relates to a method of performing computation in a hybrid quantum-classical computing system, and more specifically, to a method of solving a combinatorial optimization problem in a hybrid computing system that includes a classical computer and quantum computer that includes a group of trapped ions.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a group of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a group of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance.

In current state-of-the-art quantum computers, control of qubits is imperfect (noisy) and the number of qubits used in these quantum computers generally range from a hundred qubits to thousands of qubits. The number of quantum gates that can be used in such a quantum computer (referred to as a "noisy intermediate-scale quantum device" or "NISQ device") to construct circuits to run an algorithm within a controlled error rate is limited due to the noise.

For solving some optimization problems, a NISQ device having shallow circuits can be used in combination with a classical computer (referred to as a hybrid quantum-classical computing system). In particular, in finding an approximate solution to combinatorial optimization problems, a quantum subroutine, which is run on a NISQ device, can be run as part of a classical optimization routine, which is run on a classical computer. The classical computer (also referred to as a "classical optimizer") instructs a controller to prepare the NISQ device (also referred to as a "quantum processor") in an N-qubit state, execute quantum gate operations, and measure an outcome of the quantum processor. Subsequently, the classical optimizer instructs the controller to prepare the quantum processor in a slightly different N-qubit state, and repeats execution of the gate operation and measurement of the outcome. This cycle is repeated until the approximate solution can be extracted. Such hybrid quantum-classical computing system having a NISQ device may outperform classical computers in finding approximate solutions to such combinatorial optimization problems. However, time and resource required for the classical optimization routine based on conventional stochastic optimization methods increases exponentially as the targeted accuracy increases. Due to inefficiencies in these conventional methods cause the outcomes of these processes to be too slow to be useful and too resource intensive.

Therefore, there is a need for an efficient method for the classical optimization routine in a hybrid quantum-classical computing system.

SUMMARY

Embodiments of the present disclosure provide a method of performing computation in a hybrid quantum-classical computing system including a classical computer and a quantum processor. The method includes selecting, by a classical computer, a problem to be solved and computing a model Hamiltonian onto which the selected problem is mapped, selecting, by the classical computer, a set of variational parameters, setting a quantum processor in an initial state, where the quantum processor includes a group of trapped ions, each of which has two frequency-separated states, transforming the quantum processor from the initial state to a trial state based on the computed model Hamiltonian and the selected set of variational parameters, measuring a population of the two frequency-separated states of each trapped ion in the quantum processor, and determining if a difference between the measured population and a previously measured population of the two frequency-separated states of each trapped ion in the quantum processor is more or less than a predetermined value. The classical computer either selects another set of variational parameters based on a chaotic map if it is determined that the difference is more than the predetermined value and then sets the quantum processor in the initial state, transforms the quantum processor from the initial state to a new trial state, and measures a population of the two frequency-separated states of each trapped ion in the quantum processor after transforming the quantum processor to the new trial state, or outputting the measured population as an optimized solution to the selected problem if it is determined that the difference is less than the predetermined value. Embodiments of the disclosure may also provide a hybrid quantum-classical computing system comprising non-volatile memory having a number of instructions stored therein which, when executed by one or more processors, causes the hybrid quantum-classical computing system to perform operations of the method described above, and also other methods described herein.

Embodiments of the present disclosure also provide a hybrid quantum-classical computing system. The hybrid quantum-classical computing system includes a quantum processor comprising a group of trapped ions, each of the trapped ions having two hyperfine states defining a qubit, one or more lasers configured to emit a laser beam, which is provided to trapped ions in the quantum processor, a classical computer configured to select a problem to be solved, compute a model Hamiltonian onto which the selected problem is mapped, and select a set of variational parameters, and a system controller configured to set the quantum processor in an initial state, transform the quantum processor from the initial state to a trial state based on the computed model Hamiltonian and the selected set of variational parameters, and measure an expectation value of the model Hamiltonian on the quantum processor. The classical computer is further configured to determine if a difference between the measure population and a previously measured population of the two frequency-separated states of each trapped ion in the quantum processor is less than a predetermined value. The classical computer selects another set of variational parameters based on a chaotic map if it is determined that the difference is more than the predetermined value and then sets the quantum processor in the initial state, transforms the quantum processor from the initial state to a new trial state, measures an expectation value of the model Hamiltonian on the quantum processor after transforming the quantum processor to the new trial state, or output the measured expectation value of the model Hamiltonian as an optimized solution to the selected problem if it is determined that the difference is less than the predetermined value. Embodiments of the disclosure may also provide a hybrid quantum-classical computing system comprising non-volatile memory having a number of instructions stored therein which, when executed by one or more processors, causes the hybrid quantum-classical computing system to perform operations of the method described above.

Embodiments of the present disclosure also provide a hybrid quantum-classical computing system comprising non-volatile memory having a number of instructions stored therein. The number of instructions, when executed by one or more processors, causes the hybrid quantum-classical computing system to perform operations including select a problem to be solved and computing a model Hamiltonian onto which the selected problem is mapped, select a set of variational parameters, set a quantum processor in an initial state, wherein the quantum processor comprises a plurality of qubits, transform the quantum processor from the initial state to a trial state based on the computed model Hamiltonian and the selected set of variational parameters, measure an expectation value of the model Hamiltonian on the quantum processor, and determine if a difference between the measured expectation value of the model Hamiltonian is more or less than a predetermined value. The computer program instructions further cause the information processing system to either select another set of variational parameters based on a chaotic map if it is determined that the difference is more than the predetermined value and then set the quantum processor in the initial state, transform the quantum processor from the initial state to a new trial state, and measure an expectation value of the model Hamiltonian on the quantum processor after transforming the quantum processor to the new trial state; or output the measured population as an optimized solution to the selected problem if it is determined that the difference is less than the predetermined value. Embodiments of the disclosure may also provide a hybrid quantum-classical computing system comprising non-volatile memory having a number of instructions stored therein which, when executed by one or more processors, causes the hybrid quantum-classical computing system to perform operations of the method described above.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
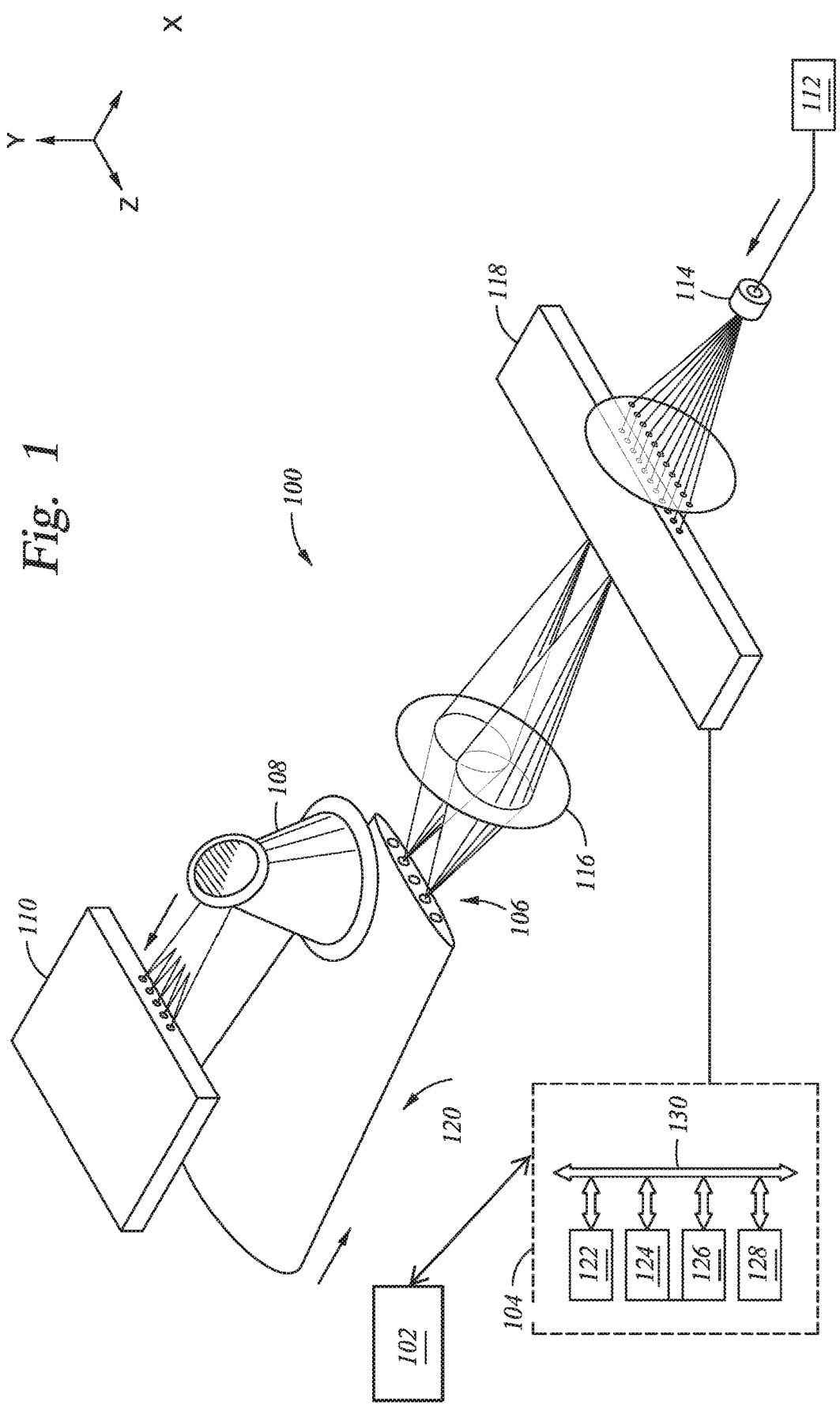
FIG. 1 is a schematic partial view of an ion trap quantum computing system according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for performing a computation using a hybrid quantum-classical computing system, and, more specifically, to providing an approximate solution to a combinatorial optimization problem using a hybrid quantum-classical computing system that includes a group of trapped ions.

A hybrid quantum-classical computing system that is able to provide a solution to a combinatorial optimization problem may include a classical computer, a system controller, and a quantum processor. The classical computer performs supporting and system control tasks including selecting a combinatorial optimization problem to be run by use of a user interface, running a classical optimization routine, translating the series of logic gates into pulses to apply on the quantum processor, and pre-calculating parameters that optimize the pulses by use of a central processing unit (CPU). A software program for performing the tasks is stored in a non-volatile memory within the classical computer.

The quantum processor includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer instructions for controlling the quantum processor, controls various hardware associated with controlling any and all aspects used to run the instructions for controlling the quantum processor, and returns a read-out of the quantum processor and thus output of results of the computation(s) to the classical computer.

The methods and systems described herein include an efficient method for an optimization routine executed by the classical computer in solving a problem in a hybrid quantum-classical computing system, which can provide improvement over the conventional method for an optimization by conventional stochastic optimization methods.

General Hardware Configurations

FIG. 1 is a schematic partial view of an ion trap quantum computing system, or system 100, according to one embodiment. The system 100 includes a classical (digital) computer 102, a system controller 104 and a quantum processor that is a group 106 of trapped ions (i.e., five shown) that extend along the Z-axis. The classical computer 102 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 108, such as an objective lens with a numerical aperture (NA), for example, of 0.37, collects fluorescence along the Y-axis from the ions and maps each ion onto a multi-channel photo-multiplier tube (PMT) 110 for measurement of individual ions. Non-copropagating Raman laser beams from a laser 112, which are provided along the X-axis, perform operations on the ions. A diffractive beam splitter 114 creates an array of static Raman beams 116 that are individually switched using a multi-channel acousto-optic modulator (AOM) 118 and is configured to selectively act on individual ions. A global Raman laser beam 120 illuminates all ions at once. The system controller (also referred to as a "RF controller") 104 controls the AOM 118 and thus controls laser pulses to be applied to trapped ions in the group 106 of trapped ions. The system controller 104 includes a central processing unit (CPU) 122, a read-only memory (ROM) 124, a random access memory (RAM) 126, a storage unit 128, and the like. The CPU 122 is a processor of the system controller 104. The ROM 124 stores various programs and the RAM 126 is the working memory for various programs and data. The storage unit 128 includes a nonvolatile memory, such as a hard disk drive (HDD) or a flash memory, and stores various programs even if power is turned off. The CPU 122, the ROM 124, the RAM 126, and the storage unit 128 are interconnected via a bus 130. The system controller 104 executes a control program which is stored in the ROM 124 or the storage unit 128 and uses the RAM 126 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
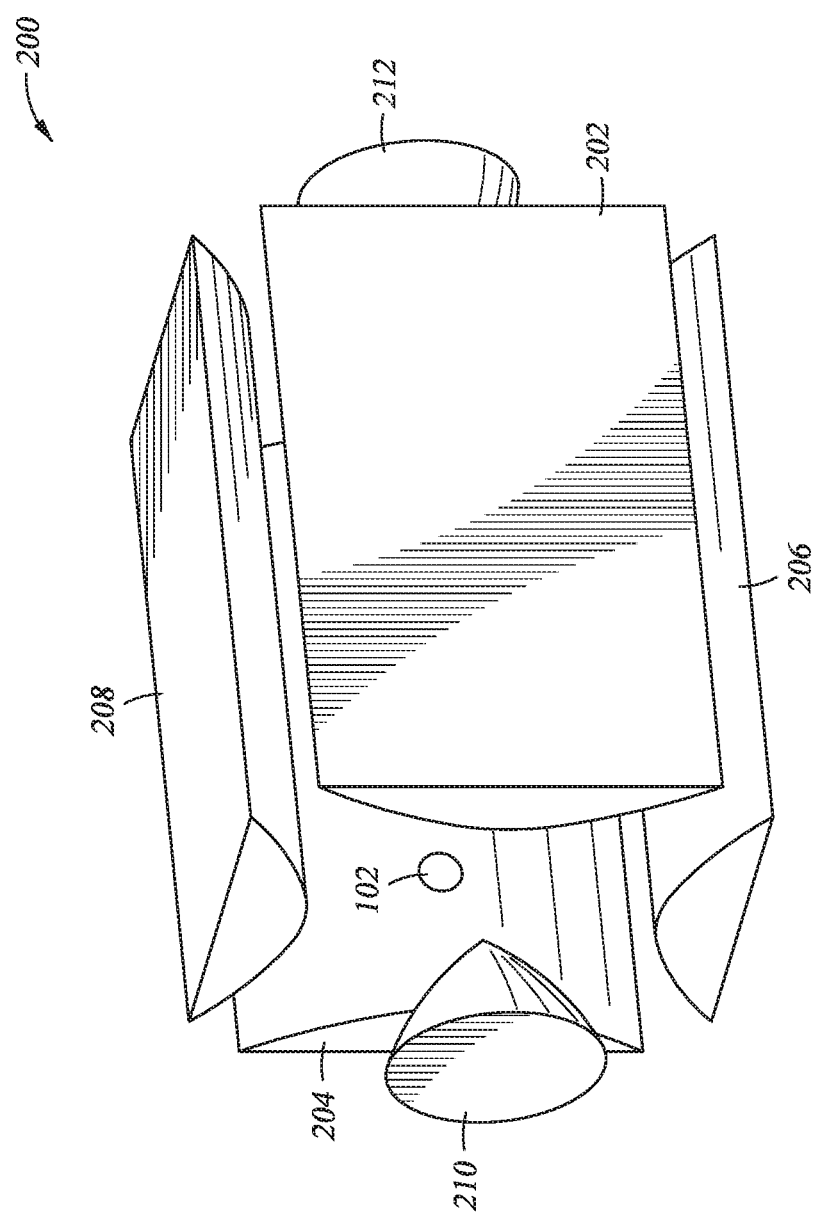
FIG. 2 depicts a schematic view of an ion trap for confining ions in a group according to one embodiment.

FIG. 2 depicts a schematic view of an ion trap 200 (also referred to as a Paul trap) for confining ions in the group 106 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the group 106 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Figure 3:
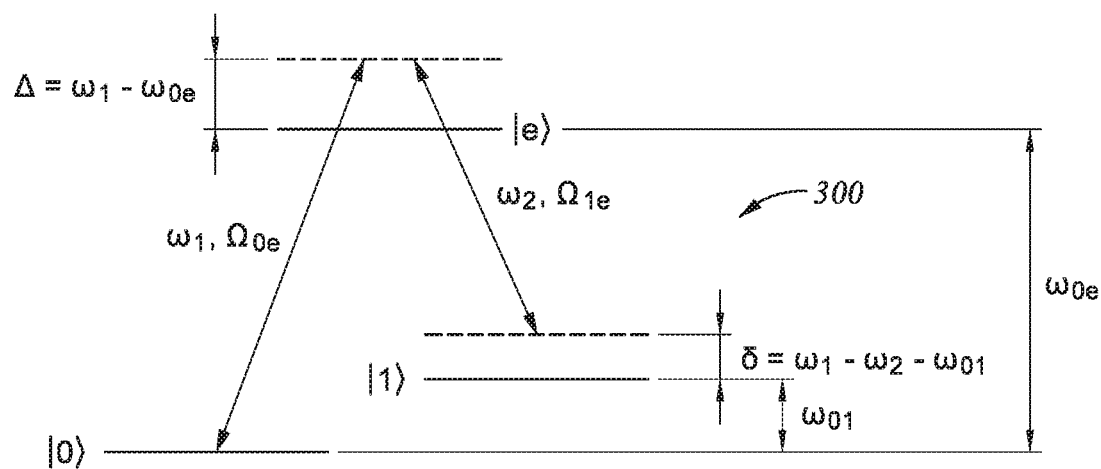
FIG. 3 depicts a schematic energy diagram of each ion in a group of trapped ions according to one embodiment.

FIG. 3 depicts a schematic energy diagram 300 of each ion in the group 106 of trapped ions according to one embodiment. In one example, each ion may be a positive Ytterbium ion, $^{171}Yb^+$, which has the $^2S_{1/2}$ hyperfine states (i.e., two electronic states) with an energy split corresponding to a frequency difference (referred to as a "carrier frequency") of $\omega_{01}/2\pi = 12.642821$ GHz. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_m$ for any motional mode m with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_m$ with the subscript m denotes the motional ground state for a motional mode m of a group 106 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 3, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 3. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of counter-propagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg^+$, and $Ba^+$) or transition metal ions ($Zn^+$, $Hg^+$, $Cd^+$).

Figure 4:
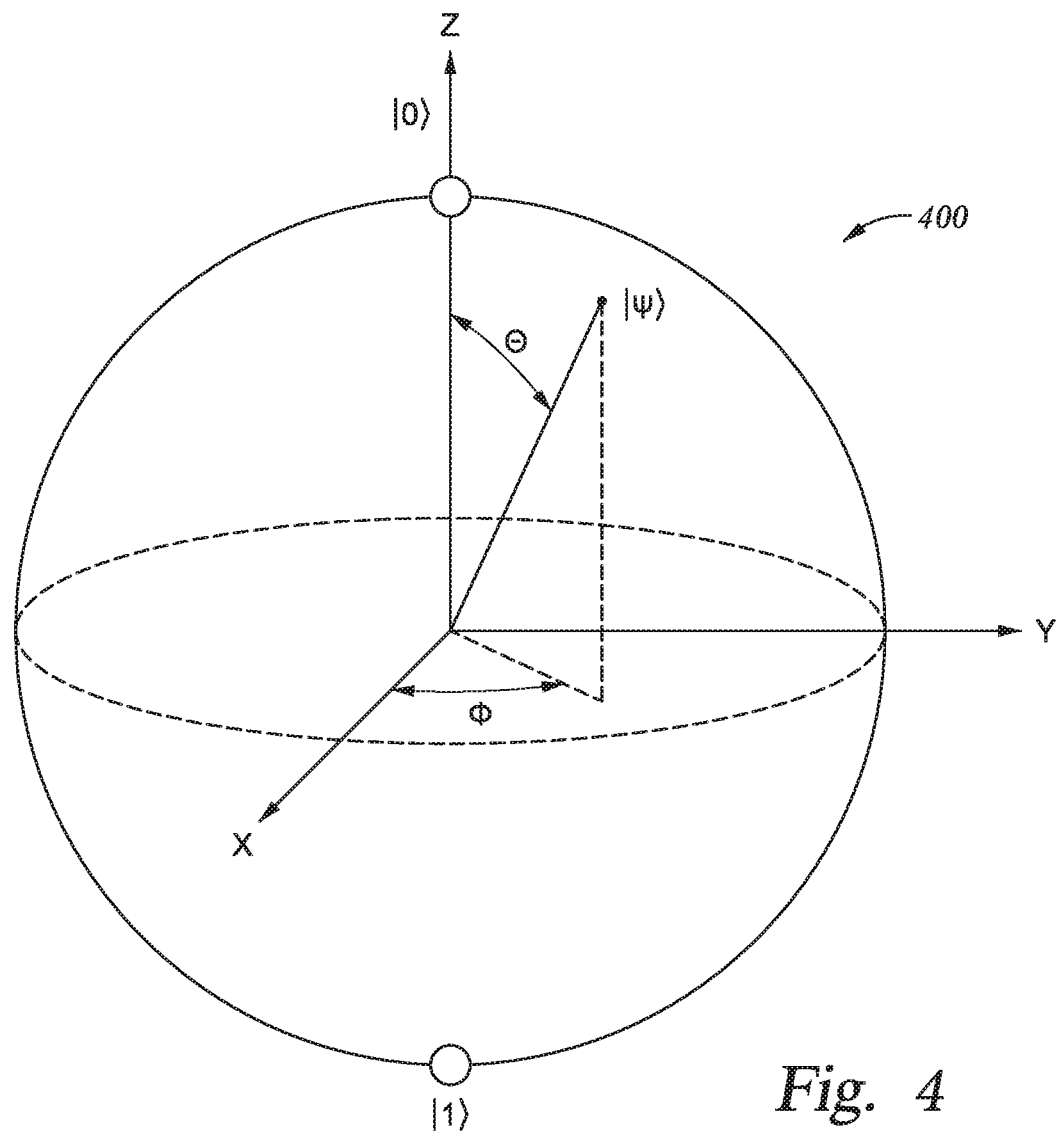
FIG. 4 depicts a qubit state of an ion represented as a point on a surface of the Bloch sphere.

FIG. 4 is provided to help visualize a qubit state of an ion is represented as a point on a surface of the Bloch sphere 400 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "$\pi$-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter without loss of generality) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "$\pi/2$-pulse". More generally, a superposition of the two qubits states $|0\rangle$ and $|1\rangle$ that are added and equally-weighted is represented by a point that lies on the equator of the Bloch sphere. For example, the superposition states $|0\rangle \pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle \pm|1\rangle$ for $\phi \pm \pi/2$). Transformation between two points on the equator (i.e., a rotation about the Z-axis on the Bloch sphere) can be implemented by shifting phases of the composite pulse.

Entanglement Formation

Figure 5A:
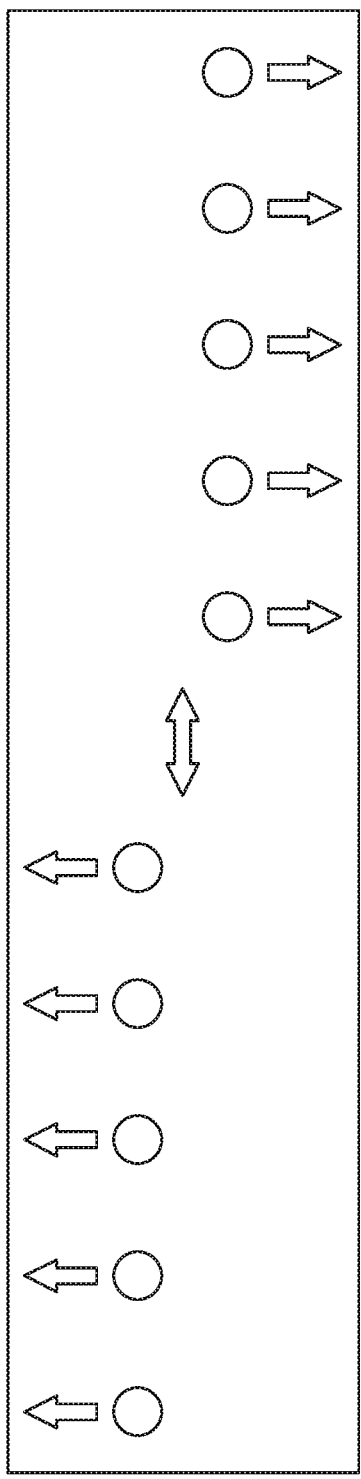
FIGS. 5A, 5B, and 5C depict a few schematic collective transverse motional mode structures of a group of five trapped ions.
Figure 5B:
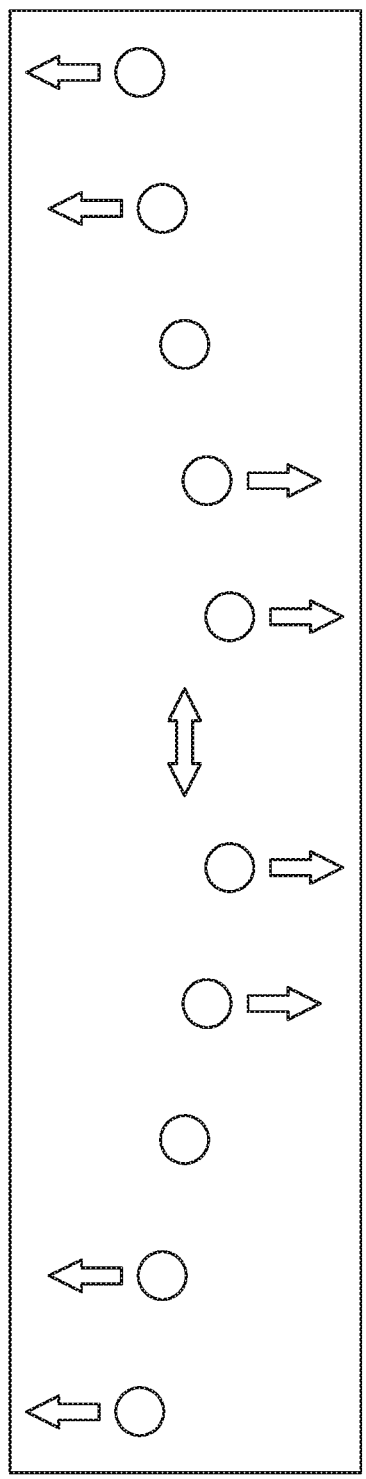
Figure 5C:
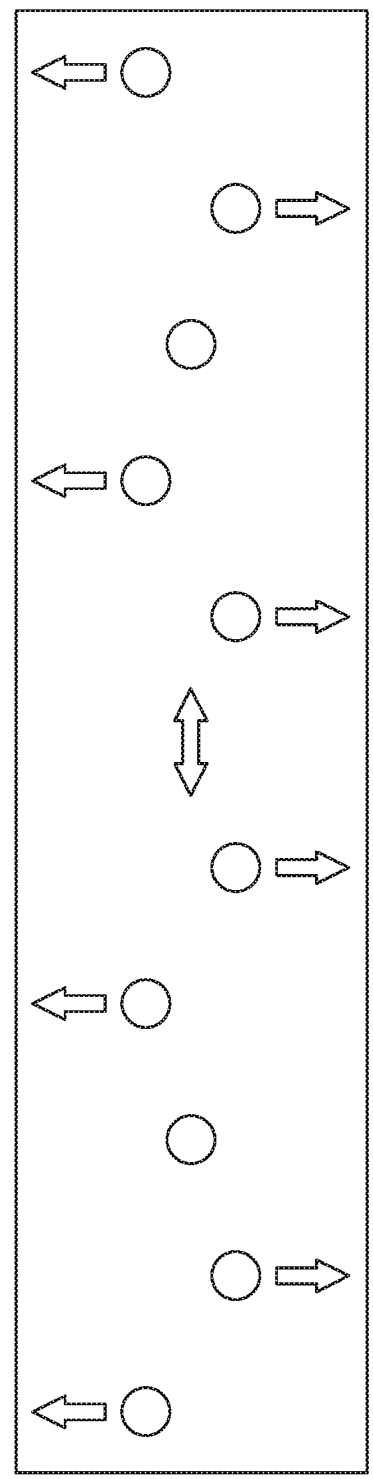

FIGS. 5A, 5B, and 5C depict a few schematic structures of collective transverse motional modes (also referred to simply as "motional mode structures") of a group 106 of five trapped ions, for example. Here, the confining potential due to a static voltage $V_S$ applied to the end-cap electrodes 210 and 212 is weaker compared to the confining potential in the radial direction. The collective motional modes of the group 106 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the m-th lowest energy is hereinafter referred to as $|n_{ph}\rangle_m$, where $n_{ph}$ denotes the number of motional quanta (in units of energy excitation, referred to as phonons) in the motional mode, and the number of motional modes M in a given transverse direction is equal to the number of trapped ions N in the group 106. FIGS. 5A-5C schematically illustrates examples of different types of collective transverse motional modes that may be experienced by five trapped ions that are positioned in a group 106. FIG. 5A is a schematic view of a common motional mode $|n_{ph}\rangle_M$ having the highest energy, where M is the number of motional modes. In the common motional mode $|n\rangle_M$, all ions oscillate in phase in the transverse direction. FIG. 5B is a schematic view of a tilt motional mode $|n_{ph}\rangle_{M-1}$ which has the second highest energy. In the tilt motional mode, ions on opposite ends move out of phase in the transverse direction (i.e., in opposite directions). FIG. 5C is a schematic view of a higher-order motional mode $|n_{ph}\rangle_{M-3}$ which has a lower energy than that of the tilt motional mode $|n_{ph}\rangle_{M-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 6A:
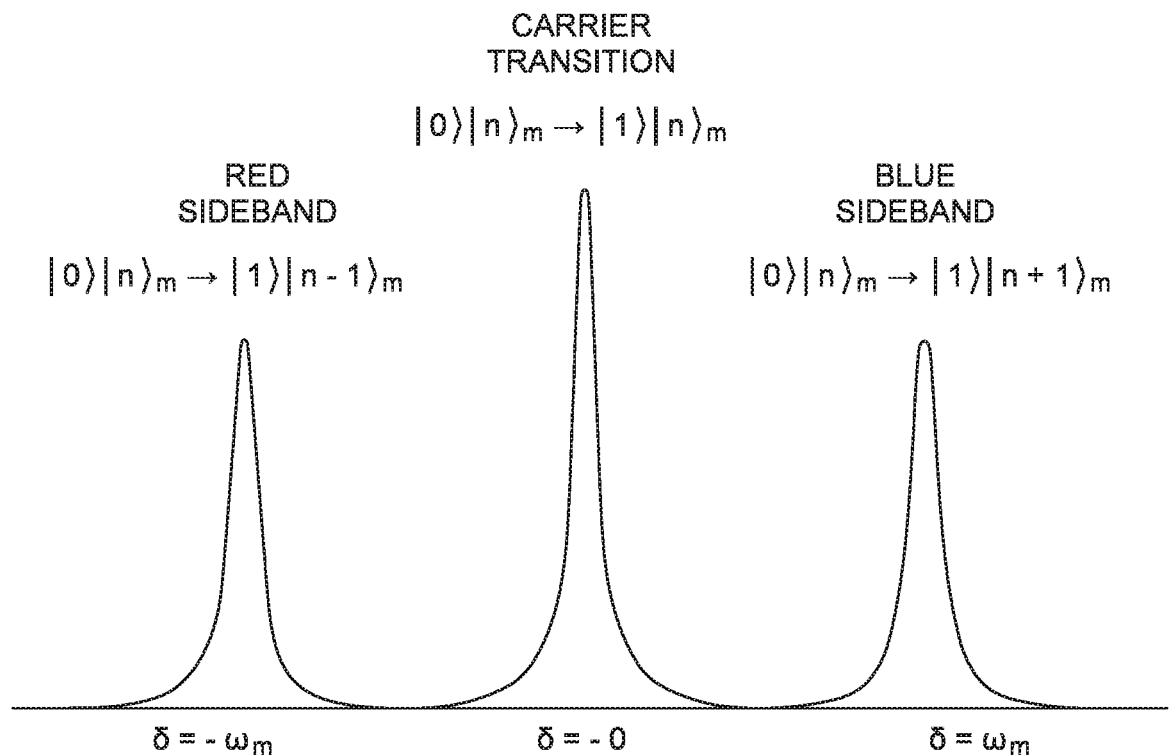
FIGS. 6A and 6B depict schematic views of motional sideband spectrum of each ion and a motional mode according to one embodiment.
Figure 6B:
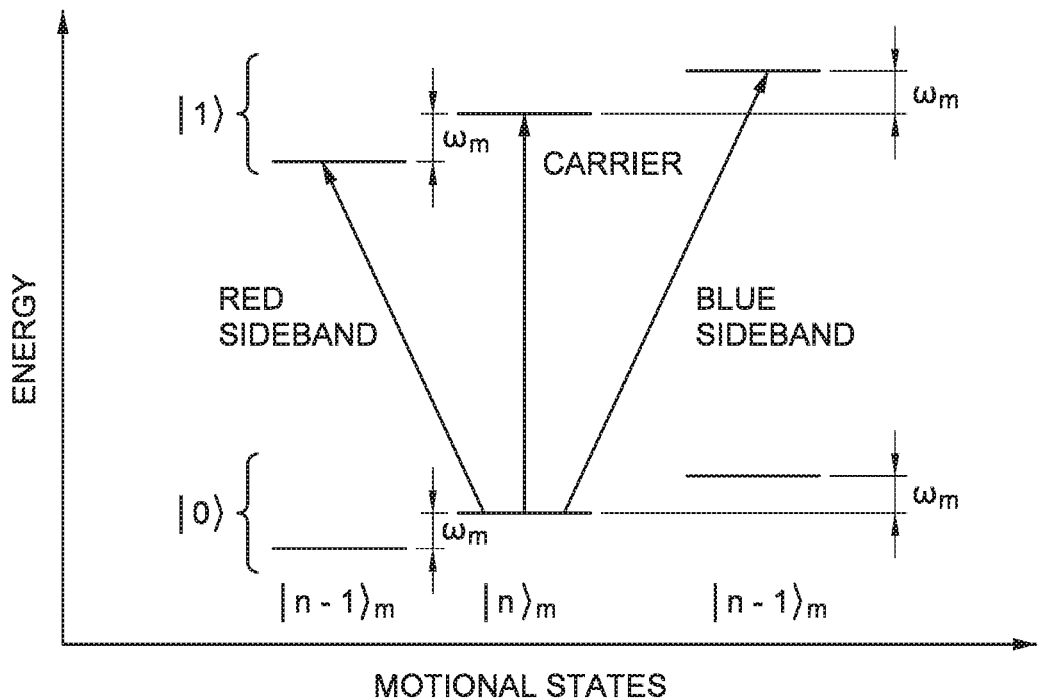

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the group 106 in a motional mode $|n_{ph}\rangle_M$ having frequency om according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle |n_{ph}\rangle_m$ and $|1\rangle |n_{ph}+1\rangle_m$ occurs (i.e., a transition from the m-th motional mode with n-phonon excitations denoted by $|n_{ph}\rangle_m$ to the m-th motional mode with $(n_{ph}+1)$-phonon excitations denoted by $|n_{ph}+1\rangle_m$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_m$ of the motional mode $|n_{ph}\rangle_m$, $\delta=\omega_1-\omega_2-\omega_{01}=-\mu<0$, referred to as a red sideband), Rabi flopping between combined qubit-motional states $|0\rangle |n_{ph}\rangle_m$ and $|1\rangle |n_{ph}-1\rangle_m$ occurs (i.e., a transition from the motional mode $|n_{ph}\rangle_m$ to the motional mode $|n_{ph}-1\rangle_m$ with one less phonon excitations occurs when the qubit state $|0\rangle$ flips to $|1\rangle$). A $\pi/2$-pulse on the blue sideband applied to a qubit transforms the combined qubit-motional state $|0\rangle |n_{ph}\rangle_m$ into a superposition of $|0\rangle |n_{ph}\rangle_m$ and $|1\rangle |_{ph}+1\rangle_m$. A $\pi/2$-pulse on the red sideband applied to a qubit transforms the combined qubit-motional $|0\rangle n_{ph}\rangle_m$ into a superposition of $|0\rangle |n_{ph}\rangle_m$ and $|1\rangle |n_{ph}-1\rangle_m$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, qubit states of a qubit can be entangled with a desired motional mode by applying the right type of pulse, such as a $\pi/2$-pulse, which can be subsequently entangled with another qubit, leading to an entanglement between the two qubits that is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and as follows:

$|0\rangle_i|0\rangle_j \rightarrow |0\rangle_i|0\rangle_j - i|1\rangle_i|1\rangle_j$ $|0\rangle_i|1\rangle_j \rightarrow |0\rangle_i|1\rangle_j - i|1\rangle_i|0\rangle_j$ $|1\rangle_i|0\rangle_j \rightarrow -i|0\rangle_i|1\rangle_j + |1\rangle_i|0\rangle_j$ $|1\rangle_i|1\rangle_j \rightarrow -i|0\rangle_i|0\rangle_j + |1\rangle_i|1\rangle_j.$ For example, when the two qubits (i-th and j-th qubits) are both initially in the hyperfine ground state $|0\rangle$ (denoted as $|0\rangle_i|0\rangle_j$) and subsequently a $\pi/2$-pulse on the blue sideband is applied to the i-th qubit, the combined state of the i-th qubit and the motional mode $|0\rangle_i|n_{ph}\rangle_m$ is transformed into a superpositin of $|0\rangle_i|n_{ph}\rangle_m$ and $|1\rangle_i n_{ph}+1\rangle_m$, and thus the combined state of the two qubits and the motional mode is transformed into a superposition of $|0\rangle_i|0\rangle_j|n_{ph}\rangle_m$ and $|1\rangle_j|n_{ph}+1\rangle_m$. When a $\pi/2$-pulse on the red sideband is applied to the j-th qubit, the combined state of the j-th qubit and the motional mode $|0\rangle_j|n_{ph}\rangle_m$ is transformed to superposition of $|0\rangle_j|n_{ph}\rangle_m$ and $|1\rangle_j|n_{ph}-1\rangle_m$ and the combined state $|0\rangle_j|n_{ph}+1\rangle_m$ is transformed into a superposition of $|0\rangle_j|n_{ph}+1\rangle_m$ and $|1\rangle_j|n_{ph}\rangle_p$.

Thus, applications of a $\pi/2$-pulse on the blue sideband on the i-th qubit and a $\pi/2$-pulse on the red sideband on the j-th qubit may transform the combined state of the two qubits and the motional mode $|0\rangle_i|0\rangle_j|n_{ph}\rangle_m$ into a superposition of $|0\rangle_i|0\rangle_j|n_{ph}\rangle_m$ and $|1\rangle_i|1\rangle_j|n_{ph}\rangle_m$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_m$ and $|0\rangle_i|1\rangle_j|n_{ph}-1\rangle_m$) can be removed by a sufficiently complex pulse sequence, and thus the combined state of the two qubits and the motional mode after the XX-gate operation may be considered disentangled as the initial number of phonon excitations $n_{ph}$ in the m-th motional mode stays unchanged at the end of the XX-gate operation. Thus, qubit states before and after the XX-gate operation will be described below generally without including the motional modes.

More generally, the combined state of i-th and j-th qubits transformed by the application of pulses on the sidebands for duration $\tau$ (referred to as a "gate duration"), having amplitudes $\Omega^{(i)}$ and $\Omega^{(j)}$ and detuning frequency $\mu$, can be described in terms of an entangling interaction $X^{(i,j)}(\tau)$ as follows:

$|0\rangle_i|0\rangle_j \rightarrow \cos(2\chi^{(i,j)}(\tau))|0\rangle_i|0\rangle_j - i\sin(2\chi^{(i,j)}(\tau))|1\rangle_i|1\rangle_j$ $|0\rangle_i|1\rangle_j \rightarrow \cos(2\chi^{(i,j)}(\tau))|0\rangle_i|1\rangle_j - i\sin(2\chi^{(i,j)}(\tau))|1\rangle_i|0\rangle_j$ $|1\rangle_i|0\rangle_j \rightarrow -i\sin(2\chi^{(i,j)}(\tau))|0\rangle_i|1\rangle_{nj} + \cos(2\chi^{(i,j)}(\tau))|1\rangle_i|0\rangle_j$ $|1\rangle_i|1\rangle_j \rightarrow -i\sin(2\chi^{(i,j)}(\tau))|0\rangle_i|0\rangle_j + \cos(2\chi^{(i,j)}(\tau))|1\rangle_i|1\rangle_j$ where, $$\chi^{(i,j)}(\tau) =$$
$$-4\sum_{m=1}^{M}\eta_m^{(i)}\eta_m^{(j)}\int_0^\tau dt_2\int_0^{t_2}dt_1\Omega^{(i)}(t_2)\Omega^{(j)}(t_1)\cos(\mu t_2)\cos(\mu t_1)\sin[\omega_m(t_2-t_1)]$$

and $\eta_m^{(i)}$ is the Lamb-Dicke parameter that quantifies the coupling strength between the i-th ion and the m-th motional mode having the frequency $\omega_m$, and M is the number of the motional modes (equal to the number N of ions in the group 106).

The entanglement interaction between two qubits described above can be used to perform an XX-gate operation. The XX-gate operation (XX gate) along with single-qubit operations (R gates) forms a set of gates {R, XX} that can be used to build a quantum computer that is configured to perform desired computational processes. Among several known sets of logic gates by which any quantum algorithm can be decomposed, a set of logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions.

To perform an XX-gate operation between i-th and j-th qubits, pulses that satisfy the condition $\chi^{(i,j)}(\tau)=\theta^{(i,j)}$ ($0<\theta^{(i,j)}\leq\pi/8$) (i.e., the entangling interaction $\chi^{(i,j)}(\tau)$ has a desired value $\theta^{(i,j)}$, referred to as condition for a non-zero entanglement interaction) are constructed and applied to the i-th and the j-th qubits. The transformations of the combined state of the i-th and the j-th qubits described above corresponds to the XX-gate operation with maximal entanglement when $\theta^{(i,j)}=\pi/8$. Amplitudes $\Omega^{(i)}(t)$ and $\Omega^{(j)}(t)$ of the pulses to be applied to the i-th and the j-th qubits are control parameters that can be adjusted to ensure a non-zero tunable entanglement of the i-th and the j-th qubits to perform a desired XX gate operation on i-th and j-th qubits.

Hybrid Quantum-Classical Computing System

While currently available quantum computers may be noisy and prone to errors, a combination of both quantum and classical computers, in which a quantum computer is a domain-specific accelerator, may be able to solve optimization problems that are beyond the reach of classical computers. An example of such optimization problems is in solving combinatorial optimization problems, where Quantum Approximate Optimization Algorithm (QAOA) perform search for optimal solutions from a set of possible solutions according to some given criteria, using a quantum computer and a classical computer. The combinatorial optimization problems that can be solved by the methods described herein may include the PageRank (PR) problem for ranking web pages in search engine results and the maximum-cut (Max-Cut) problem with applications in clustering, network science, and statistical physics. The MaxCut problem aims at grouping nodes of a graph into two partitions by cutting across links between them in such a way that a weighted sum of intersected edges is maximized. The combinatorial optimization problems that can be solved by the methods described herein may further include the travelling salesman problem for finding shortest and/or cheapest round trips visiting all given cities. The travelling salesman problem is applied to scheduling a printing press for a periodical with multi-editions, scheduling school buses minimizing the number of routes and total distance while no bus is overloaded or exceeds a maximum allowed policy, scheduling a crew of messengers to pick up deposit from branch banks and return the deposit to a central bank, determining an optimal path for each army planner to accomplish the goals of the mission in minimum possible time, designing global navigation satellite system (GNSS) surveying networks, and the like. Another combinatorial optimization problem is the knapsack problem to find a way to pack a knapsack to get the maximum total value, given some items. The knapsack problem is applied to resource allocation given financial constraints in home energy management, network selection for mobile nodes, cognitive radio networks, sensor selection in distributed multiple radar, or the like.

A combinatorial optimization problem is modeled by an objective function (also referred to as a cost function) that maps events or values of one or more variables onto real numbers representing "cost" associated with the events or values and seeks to minimize the cost function. In some cases, the combinatorial optimization problem may seek to maximize the objective function. The combinatorial optimization problem is further mapped onto a simple physical system described by a model Hamiltonian (corresponding to the sum of kinetic energy and potential energy of all particles in the system) and the problem seeks the low-lying energy state of the physical system.

This hybrid quantum-classical computing system has at least the following advantages. First, an initial guess is derived from a classical computer, and thus the initial guess does not need to be constructed in a quantum processor that may not be reliable due to inherent and unwanted noise in the system. Second, a quantum processor performs a small-sized (e.g., between a hundred qubits and a few thousand qubits) but accelerated operation (that can be performed using a small number of quantum logic gates) between an input of a guess from the classical computer and a measurement of a resulting state, and thus a NISQ device can execute the operation without a significant amount of accumulating errors. Thus, the hybrid quantum-classical computing system may allow challenging problems to be solved, such as small but challenging combinatorial optimization problems, which are not practically feasible on classical computers, or suggest ways to speed up the computation with respect to the results that would be achieved using the best known classical algorithm.

Figure 7:
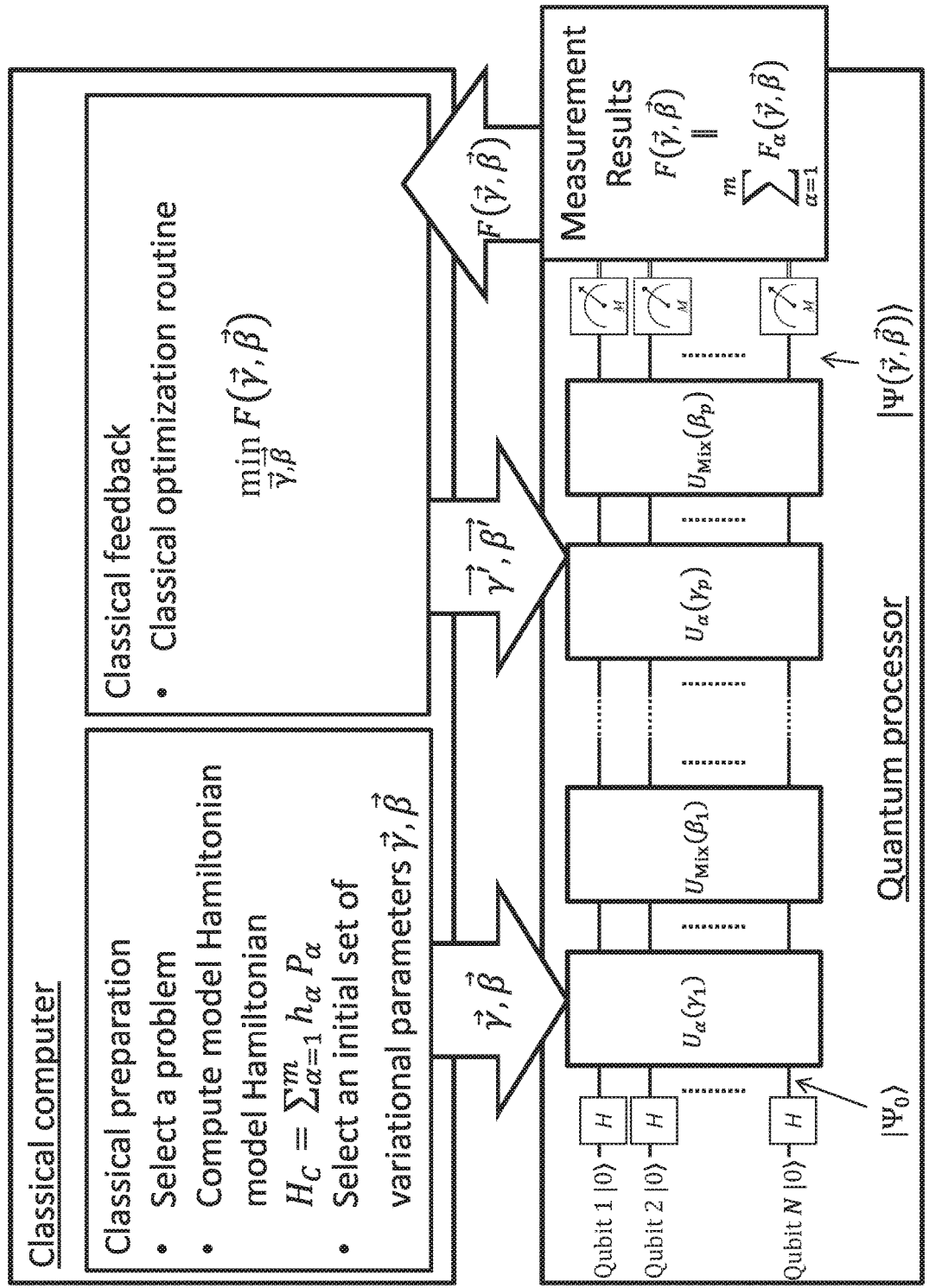
FIG. 7 depicts an overall hybrid quantum-classical computing system for obtaining a solution to a combinatorial optimization problem by Quantum Approximate Optimization Algorithm (QAOA) according to one embodiment.
Figure 8:
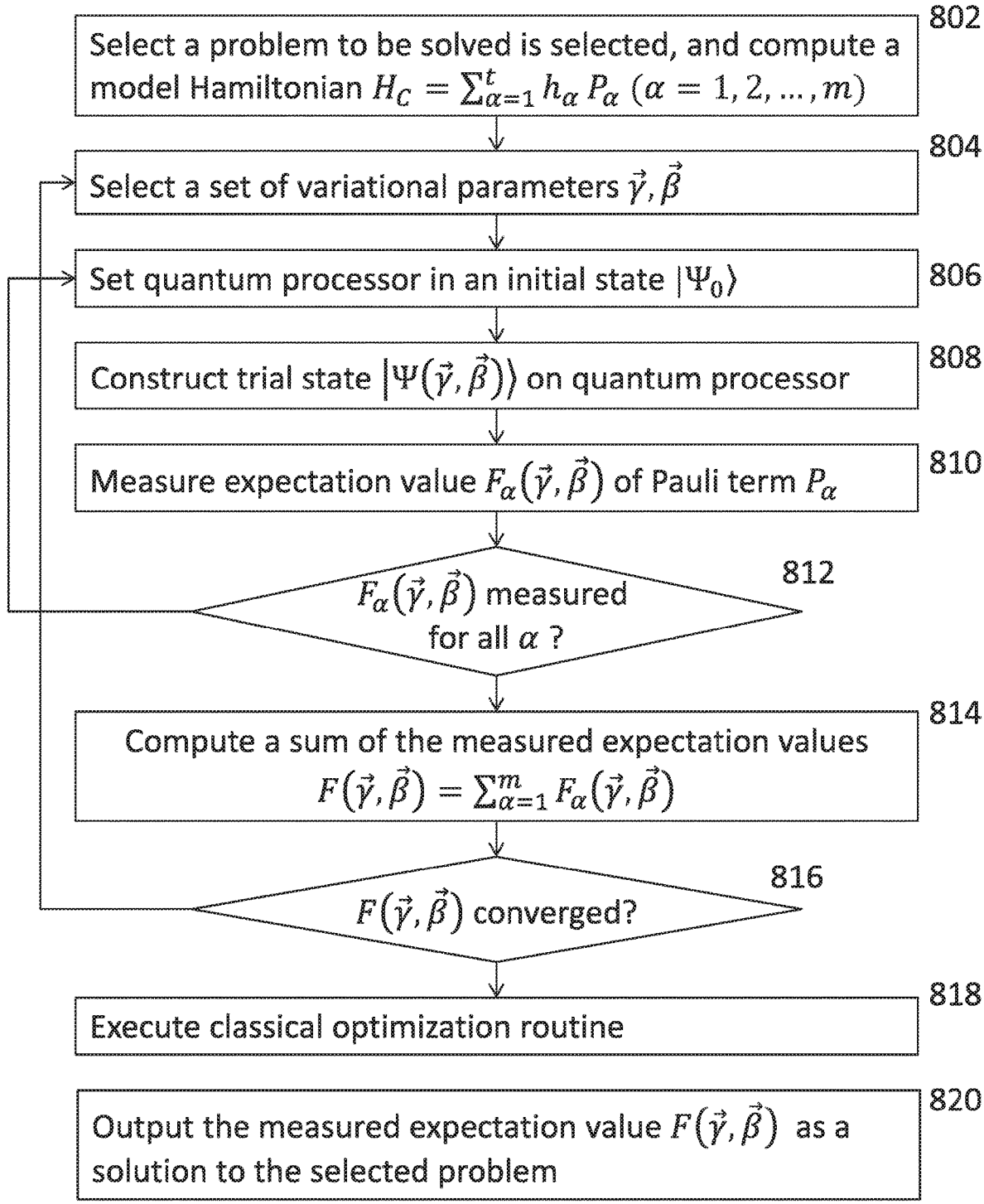
FIG. 8 depicts a flowchart illustrating a method of obtaining a solution to a combinatorial optimization problem by Quantum Approximate Optimization Algorithm (QAOA) according to one embodiment.

FIGS. 7 and 8 depict an overall hybrid quantum-classical computing system 700 and a flowchart illustrating a method 800 of obtaining a solution to a combinatorial optimization problem by Quantum Approximate Optimization Algorithm (QAOA) according to one embodiment. In this example, the quantum processor is the group 106 of N trapped ions, in which the two hyperfine states of each of the N trapped ions form a qubit.

The Approximate Optimization Algorithm (QAOA) relies on a variational search by a well-known variational method. The variational method consists of iterations that include choosing a "trial state" of the quantum processor depending on a set of one or more parameters (referred to as "variational parameters") and measuring an expectation value of the model Hamiltonian (e.g., energy) of the trial state. A set of variational parameters (and thus a corresponding trial state) is adjusted and an optimal set of variational parameters are found that minimizes the expectation value of the model Hamiltonian (the energy). The resulting energy is an approximation to the exact lowest energy state.

In block 802, by the classical computer 102, a combinatorial optimization problem to be solved is selected, for example, by use of a user interface of the classical computer 102, or retrieved from the memory of the classical computer 102, and a model Hamiltonian $H_C$, to which the selected combinatorial optimization problem is mapped, is computed.

In a combinatorial optimization problem defined on a set of N binary variables with t constrains ($\alpha=1, 2, \ldots$ t), the objective function is the number of satisfied clauses $C(z)=\Sigma_{\alpha=1}^{t} C_\alpha (z)$ or a weighted sum of satisfied clauses $C(z)=\tau_{\alpha=1}^{t} h_\alpha C_\alpha (z)$ ($h_\alpha$ corresponds to a weight for each constraint $\alpha$), where $z=z_1 z_2 \ldots z_N$ is a N-bit string and $C_\alpha(z)=1$ if z satisfies the constraint $\alpha$. The clause $C_\alpha(z)$ that describes the constraint $\alpha$ typically includes a small number of variables $z_i$. The goal is to minimize the objective function. Minimizing this objective function can be converted to finding a low-lying energy state of a model Hamiltonian $H_C=\tau_{\alpha=1}^{t} h_\alpha P_\alpha$ by mapping each binary variable $z_i$ to a quantum spin $\sigma_i^z$ and the constraints to the couplings among the quantum spins $\sigma_i^z$, where $P_\alpha$ is a Pauli string (also referred to as a Pauli term) $P_\alpha = \sigma_1^{\alpha_1} \otimes \sigma_2^{\alpha_2} \otimes \ldots \sigma_N^{\alpha_N}$ and $\sigma_N^{\alpha_i}$ is either the identity operator I or the Pauli matrix $\sigma_i^X$, $\sigma_i^Y$, or $\sigma_i^z$. Here t stands for the number of couplings among the quantum spins and $h_\alpha$ ($\alpha=1, 2, \ldots$, t) stands for the strength of the coupling $\alpha$.

The quantum processor 106 has N qubits and each quantum spin $\sigma_i^z$ (i=1, 2, \ldots, N) is encoded in qubit i (i=1, 2, \ldots, N) in the quantum processor 106. For example, the spin-up and spin-down states of the quantum spin $\sigma_i^z$ are encoded as $|0\rangle$ and $|1\rangle$ of the qubit i.

In block 804, following the mapping of the selected combinatorial optimization problem onto a model Hamiltonian $H_C=\Sigma_{\alpha=1}^{t} h_\alpha P_\alpha$, a set of variational parameters ($\vec{\gamma}=\gamma_1, \gamma_2, \ldots, \gamma_p$, $\vec{\beta}=\beta_1, \beta_2, \ldots, \beta_p$) is selected, by the classical computer 102, to construct a sequence of gates (also referred to a "trial state preparation circuit") $A(\vec{\gamma}, \vec{\beta})$, which prepares the quantum processor 106 in a trial state $|\Psi(\vec{\gamma}, \vec{\beta})\rangle$. For the initial iteration, a set of variational parameters $\vec{\gamma}, \vec{\beta}$ may be randomly chosen. This trial state $|\Psi(\vec{\gamma}, \vec{\beta})\rangle$ is used to provide an expectation value of each Pauli term $P_\alpha$ ($\alpha=1, 2, \ldots$, t) of the model Hamiltonian $H_C$. The trial state preparation circuit $A(\vec{\gamma}, \vec{\beta})$ includes p layers (i.e., p-time repetitions) of a model-Hamiltonian circuit $U(\gamma_l)=e^{-i\gamma_l H_C}$ and a mixing circuit $U_{Mix}(\beta_l)$ that relates to a mixing term $$H_B = \sum_{i=1}^{n} \sigma_i^{\alpha_i} (U_{Mix}(\beta_l) = e^{-i\beta_l H_B})(l = 1, 2, \ldots, p)$$

as $$A(\vec{\gamma}, \vec{\beta}) = U_{Mix}(\beta_p)U(\gamma_p)U_{Mix}(\beta_{p-1})U(\gamma_{p-1}) \ldots U_{Mix}(\beta_1)U(\gamma_1).$$

Each term $\sigma_i^{\alpha_i}$ in the mixing term $H_B$ corresponds to an orthogonal Pauli matrix to $\sigma_i^{\alpha_i}$.

In block 806, following the selection of a set of variational parameters $\vec{\gamma}, \vec{\beta}$, the quantum processor 106 is set in an initial state $|\Psi_0\rangle$ by the system controller 104. The initial state $|\Psi_0\rangle$ may be in the hyperfine ground state of the quantum processor 106. A qubit can be set in the hyperfine ground state $|0\rangle$ by optical pumping and in the superposition state $|0\rangle + |1\rangle$ by application of a proper combination of single-qubit operations (denoted by "H" in FIG. 7) to the hyperfine ground state $|0\rangle$.

In block 808, following the preparation of the quantum processor 106 in the initial state $|\Psi_0\rangle$, the trial state preparation circuit $A(\vec{\gamma}, \vec{\beta})$ is applied to the quantum processor 106, by the system controller 104, to construct the trial state $|\Psi(\vec{\gamma}, \vec{\beta})\rangle$. The trial state preparation circuit $A(\vec{\gamma}, \vec{\beta})$ is decomposed into series of XX-gate operations (XX gates) and single-qubit operations (R gates) and optimized by the classical computer 102. The series of XX-gate operations (XX gates) and single-qubit operations (R gates) can be implemented by application of a series of laser pulses, intensities, durations, and detuning of which are appropriately adjusted by the classical computer 102 on the set initial state $|\Psi_0\rangle$ and transform the quantum processor from the initial state $|\Psi_0\rangle$ to trial state $|\Psi(\vec{\gamma}, \vec{\beta})\rangle$.

In block 810, following the construction of the trial state $|\Psi(\vec{\gamma}, \vec{\beta})\rangle$ on the quantum processor 106, the expectation value $F_\alpha(\vec{\gamma}, \vec{\beta})=\langle\Psi(\vec{\gamma}, \vec{\beta})|P_\alpha|\Psi(\vec{\gamma}, \vec{\beta})\rangle$ of the Pauli term $P_\alpha$ ($\alpha=1, 2, \ldots$, m) is measured by the system controller 104. In one embodiment, appropriate basis changes are made to individual qubits for a given $P_\alpha$ prior to measurement so that repeated measurements of populations of the trapped ions in the group 106 of trapped ions (by collecting fluorescence from each trapped ion and mapping onto the PMT 110) yield the expectation value the Pauli term $P_\alpha$ of the trial state $|\Psi(\vec{\gamma}, \vec{\beta})\rangle$.

In block 812, following the measurement of the expectation value of the Pauli term $P_\alpha$ ($\alpha=1, 2, \ldots$, m), blocks 806 to 810 for another Pauli term $P_\alpha$ ($\alpha=1, 2, \ldots$, m) until the expectation values of all the Pauli terms $P_\alpha$ ($\alpha=1, 2, \ldots$, m) of the model Hamiltonian $H_C=\Sigma_{\alpha=1}^{m} h_\alpha P_\alpha$ have been measured by the system controller 104.

In block 814, following the measurement of the expectation values of all the Pauli terms $P_\alpha$ ($\alpha=1, 2, \ldots$, m), a sum of the measured expectation values of all the Pauli terms $P_\alpha$ ($\alpha=1, 2, \ldots$, m) of the model Hamiltonian $H_C=\Sigma_{\alpha=1}^{m} h_\alpha P_\alpha$ (that is, the measured expectation value of the model Hamiltonian $H_C$, $F(\vec{\gamma}, \vec{\beta})=\Sigma_{\alpha=1}^{m} F_\alpha(\vec{\gamma}, \vec{\beta})=\Sigma_{\alpha=1}^{m} \langle\Psi(\vec{\gamma}, \vec{\beta})|P_\alpha|\Psi(\vec{\gamma}, \vec{\beta})\rangle$) is computed, by the classical computer 102.

In block 816, following the computation of the measured expectation value of the model Hamiltonian $H_C$, the measured expectation value $F(\vec{\gamma}, \vec{\beta})$ of the model Hamiltonian $H_C$ is compared to the measured expectation value of the model Hamiltonian $H_C$ in the previous iteration, by the classical computer 102. If a difference between the two values is less than a predetermined value (i.e., the expectation value sufficiently converges towards a fixed value), the method proceeds to block 820. If the difference between the two values is more than the predetermined value, the method proceeds to block 818.

In block 818, another set of variational parameters $\vec{\gamma}, \vec{\beta}$ for a next iteration of blocks 806 to 816 is computed by the classical computer 102, in search for an optimal set of variational parameters $\vec{\gamma}, \vec{\beta}$ to minimize the expectation value of the model Hamiltonian $H_C$, $F(\vec{\gamma}, \vec{\beta})=\Sigma_{\alpha=1}^{m} \langle\Psi(\vec{\gamma}, \vec{\beta})|P_\alpha\Psi(\vec{\gamma}, \vec{\beta})\rangle$. That is, the classical computer 102 will execute a classical optimization routine to find the optimal set of variational parameters $\vec{\gamma}$, $\vec{\beta}$ ($F(\vec{\gamma}, \vec{\beta})$). As the number of layers p increases, the accuracy of the measured expectation value of the model Hamiltonian $H_C$ is improved. However, with increasing p, circuit depth of the trial state preparation circuit $A(\vec{\gamma}, \vec{\beta})$ increases and errors due to the noise in a NISQ device will be accumulated. Furthermore, a variational search space in which the optimal variational parameters (the number of which is 2p) is searched by a conventional classical stochastic optimization algorithm, such as simultaneous perturbation stochastic approximation (SPSA), particle swarm optimization (PSO), Bayesian optimization (BO), and Nelder-Mead (NM), generally increases exponentially and thus the optimization becomes generally exponentially difficult as the number of p increases.

In the embodiments described herein, a set of variational parameters $\vec{\gamma}$, $\vec{\beta}$ for a next iteration is computed by replacing all or some of $\gamma_1, \gamma_2, \ldots, \gamma_p$ and $\beta_1, \beta_2, \ldots, \beta_p$ according to the functions $f(\gamma_l, p, M, r, s)$ and $g(\beta_l, p, M, r, s)$, respectively, where the functions $f(\gamma_l, p, M, r, s)$ and $g(\beta_l, p, M, r, s)$ are well-known chaotic maps that update given the variational parameters $\gamma_l, \beta_l$, to the variational parameters $\gamma'_l$, $\beta'_l$, for a next iteration as $\gamma'_l = f(\gamma_l, p, M, r, s)$ and $\beta'_l = g(\beta_l, p, M, r, s)$, respectively, based on a chaotic map M. Here, r represents a tuning parameter, and s represents the number of evaluations of the chaotic map M. In some embodiments, the processes performed during block 818 include the use of a chaotic map, such as, for example, a one-dimensional chaotic map for independently updating $\gamma_l$ to $\gamma'_l$ and $\beta_l$ to $\beta'_l$. Examples of one-dimensional chaotic maps include a logistic map, Kent map, Bernoulli shift map, sine map, ICMIC map, circle map, Chebyshev map, and Gaussian map. Alternatively, a two-dimensional chaotic map may be used to map a set of $\gamma_l$ and $\beta_l$ to another set of $\gamma'_l$ and $\beta'_l$ by mapping gamma ($\gamma_l$) and beta ($\beta_l$) to the first and second dimensions in the chaotic map, respectively. In some embodiments, the variational parameters $\gamma_l$, $\beta_l$ are updated at every iteration (in a discrete manner in time domain) and thus chaotic maps that are discrete in time domain are used. However, in some embodiments, the variational parameters $\gamma_l$, $\beta_l$ may be updated in a continuous manner in time domain (e.g., based on a differential equation) and chaotic maps that are continuous in time domain may be used. However, in general, different chaotic maps that have different properties in the time domain, space domain, space dimensions, or number of parameters may be used to perform the combinatorial optimization process. The chaotic maps (i.e., the functions $f(\gamma_l, p, M, r, s)$ and $g(\beta_l, p, M, r, s)$) may be tuned (i.e., meta-optimized by adjusting the tuning parameter r) by another optimization method by well-known methods such as meta-evolution, super-optimization, automated parameter calibration, hyper-heuristics, and the like. Properly tuned chaotic maps increase the accuracy of the solution of the selected combinatorial optimization.

For example, the logistic map may be used to update a set of variational parameters $\gamma_l$ and $\beta_l$, to $\gamma'_l = r\gamma_l(1-\gamma_l)$ and $\beta'_l = r\beta_l(1-\beta_l)$, respectively, during block 818. The tuning parameter r influences performance of the search algorithm (often referred to as the exploration-exploitation tradeoff). Exploration is the ability to explore various regions in the search space to locate a minimum, preferably a global minimum of the expectation value of the model Hamiltonian $H_C$. Exploitation is the ability to concentrate the search around a promising candidate solution in order to locate the minimum of the expectation value of the model Hamiltonian $H_C$ precisely. The logistic map is most chaotic when the tuning parameter r=4, allowing one to explore the largest search area to locate a good minimum (i.e., close to the global minimum) of the expectation value of the model Hamiltonian $H_C$. The minimum of the expectation value of the model Hamiltonian $H_C$ thus found is an approximate solution to the exact lowest energy of the model Hamiltonian $H_C$. In one example, in which a simulation using a Gaussian noise source to mimic general noise characteristics of a hybrid quantum-classical computing system was used, it was found that when the logistic map with tuning parameter r=4 was used, the approximation ratio of the approximate solution relative to the exact lowest energy of the model Hamiltonian $H_C$ for a MAXCUT problem with 7 nodes ranges between 0.68 and 0.72. With the tuning parameter r=2.5, the approximation ratio drops at about 0.58. In this example, blocks 806 to 818 are iterated 100,000 times (i.e., the number of times of the set of variational parameters $\vec{\gamma}$, $\vec{\beta}$ was updated s=100,000) until the measured expectation value of the model Hamiltonian $H_C$ sufficiently converges.

The Kent map may also be used to update a set of variational parameters $\gamma_l$ and $$\beta_l \text{ to } \gamma'_l = \begin{cases} \frac{\gamma_l}{m}, & 0 < \gamma_l < m \\ \frac{1-\gamma_l}{1-m}, & m < \gamma_l < 1 \end{cases},$$

$$\beta'_l = \begin{cases} \frac{\beta_l}{m}, & 0 < \beta_l < m \\ \frac{1-\beta_l}{1-m}, & m < \beta_l < 1 \end{cases}$$

(where $0 < m < 1$), respectively, during block 818. The Kent map is in the most chaotic regime when the tuning parameter r is the farthest from 0.5. Similar to the example above, a simulation using a Gaussian noise source was used, in which it was found that when the Kent map with the tuning parameter r=0.99 was used, the approximation ratio ranges between 0.68 and 0.77 for a MAXCUT problem with 7 nodes. With the tuning parameter r=0.5, the approximation ratio was found to drop to about 0.59. In this example, blocks 806 to 818 are iterated 100 times (i.e., the number of times the set of variational parameters $\vec{\gamma}$, $\vec{\beta}$ was updated s=100) until the measured expectation value of the model Hamiltonian $H_C$ sufficiently converges. Therefore, in this example, by making the selection of the Kent chaotic map versus the logistic chaotic map provided a significant decrease in the number of iterations that were required to solve the MAXCUT problem, leading to a significant decrease in the total processing time due to this selection. One will note that non-Gaussian noise sources can occur in hybrid quantum-classical computing systems and the selection of a preferred chaos map can vary depending on the characteristics of the noisy source. Thus, depending on the characteristics of the variational parameters, the chaotic map, and noise exhibited in the hybrid quantum-classical computing system one skilled in the art (or the classical computer itself) may select a preferred chaotic map and tuning parameters.

The functions $f(\gamma_l, p, M, r, s)$ and $g(\beta_l, p, M, r, s)$ may include different chaotic maps or the same chaotic maps that are differently tuned in different iterations, depending on the structures of the selected combinatorial optimization problem and/or desired optimization strategies.

With the chaotic mapping, optimization of 2p parameters by a conventional classical stochastic optimization algorithm is effectively converted into optimization of a parameters, where the number a is less than 2p, resulting in an exponentially smaller variational search space. A smaller variational search space reduces iterations of measuring expectation values of the model Hamiltonian $H_C$, and thus the total number of quantum circuits to run on the quantum processor 106, which brings down the time and cost of solving a problem in a hybrid quantum-classical computing system.

In block 820, the classical computer 102 will typically output the results of the variational search to a user interface of the classical computer 102 and/or save the results of the variational search in the memory of the classical computer 102. The results of the variational search will include the measured expectation value of the model Hamiltonian $H_C$ in the final iteration corresponding to the minimized value of the objective function $C(z)=\Sigma_{\alpha=1}^r h_\alpha C_\alpha (z)$ of the selected combinatorial optimization problem (e.g., a shortest distance for all of the trips visiting all given cities in a travelling salesman problem) and the measurement of the trail state $|\Psi_\alpha(\vec{\gamma}, \vec{\beta})\rangle$ in the final iteration corresponding to the solution to the N-bit string ($z=z_1 z_2 \ldots z_N$) that provides the minimized value of the objective function $C(z)=\Sigma_{\alpha=1}^r h_\alpha C_\alpha (z)$ of the selected combinatorial optimization problem (e.g., a route of the trips to visit all of the given cities that provides the shortest distance for a travelling salesman).

It should be noted that the particular example embodiments described above are just some possible examples of a hybrid quantum-classical computing system according to the present disclosure and do not limit the possible configurations, specifications, or the like of hybrid quantum-classical computing systems according to the present disclosure. For example, a quantum processor within a hybrid quantum-classical computing system is not limited to a group of trapped ions described above. For example, a quantum processor may be a superconducting circuit that includes micrometer-sized loops of superconducting metal interrupted by a number of Josephson junctions, functioning as qubits (referred to as flux qubits). The junction parameters are engineered during fabrication so that a persistent current will flow continuously when an external magnetic flux is applied. As only an integer number of flux quanta are allowed to penetrate in each loop, clockwise or counter-clockwise persistent currents are developed in the loop to compensate (screen or enhance) a non-integer external magnetic flux applied to the loop. The two states corresponding to the clockwise and counter-clockwise persistent currents are the lowest energy states; differ only by the relative quantum phase. Higher energy states correspond to much larger persistent currents, thus are well separated energetically from the lowest two eigenstates. The two lowest eigenstates are used to represent qubit states $|0\rangle$ and $|1\rangle$. An individual qubit state of each qubit device may be manipulated by application of a series of microwave pulses, frequency and duration of which are appropriately adjusted.

The variational search with chaotic maps described herein provides an improved method for optimizing variational parameters by a classical computer within the Quantum Approximate Optimization Algorithm (QAOA) performed on a hybrid quantum-classical computing system. Thus, the feasibility that a hybrid quantum-classical computing system may allow solving problems, which are not practically feasible on classical computers, or suggest a considerable speed up with respect to the best known classical algorithm even with a noisy intermediate-scale quantum device (NISQ) device.

While the foregoing is directed to specific embodiments, other and further embodiments may be devised without departing from the basic scope thereof, and the scope thereof is determined by the claims that follow.

The invention claimed is:

1. A method of performing computation in a hybrid quantum-classical computing system comprising a classical computer and a quantum processor, comprising:
   selecting a maximum-cut (MaxCut) problem to be solved;
   executing iterations, each iteration comprising:
      setting a quantum processor in an initial state, wherein the quantum processor comprises a plurality of trapped ions, each having two frequency-separated states defining a qubit;
      computing a set of first variational parameters and second variational parameters, wherein the set of first variational parameters and second variational parameters is selected randomly in the initial iteration, and updated from the set of first variational parameters and second variational parameters in the previous iteration using a chaotic map that comprises a tuning parameter, wherein the tuning parameter is adjusted to maximize an approximation ratio of an approximate solution relative to the exact solution of the MaxCut problem;
      computing a plurality of model Hamiltonian circuits using the selected first variational parameters, and a plurality of mixing circuits using the selected second variational parameters, wherein each of the plurality of model Hamiltonian circuits implements a model Hamiltonian to which the MaxCut problem corresponds;
      applying a trial state preparation circuit to the quantum processor to transform the quantum processor from the initial state to a trial state, wherein the trial state preparation circuit comprises the plurality of model Hamiltonian circuits and the plurality of mixing; and
      measuring an expectation value of the model Hamiltonian on the quantum processor; and
   outputting, by a classical computer, the measured expectation value of the model Hamiltonian as an optimized solution to the MaxCut problem.

2. The method according to claim 1, wherein the chaotic map comprises a logistic map.

3. The method according to claim 1, wherein setting the quantum processor in the initial state comprising setting, by a system controller, each trapped ion in the quantum processor in a superposition of the two frequency-separated states.

4. A hybrid quantum-classical computing system, comprising:
   a quantum processor comprising a group of trapped ions, each of the trapped ions having two frequency-separated states defining a qubit;
   one or more lasers configured to emit a laser beam, which is provided to trapped ions in the quantum processor;
   a system controller configured to:
      selecting a maximum-cut (MaxCut) problem to be solved;
      execute iterations, each iteration comprising:
         setting the quantum processor in an initial state, by the use of the one or more lasers;

computing a set of first variational parameters and second variational parameters, wherein the set of first variational parameters and second variational parameters is selected randomly in the initial iteration, and updated from the set of first variational parameters and second variational parameters in the previous iteration using a chaotic map that comprises a tuning parameter, wherein the tuning parameter is adjusted to maximize an approximation ratio of an approximate solution relative to the exact solution of the MaxCut problem;

computing a plurality of model Hamiltonian circuits using the selected first variational parameters, and a plurality of mixing circuits using the selected second variational parameters, wherein each of the plurality of model Hamiltonian circuits implements a model Hamiltonian to which the MaxCut problem corresponds;

applying a trial state preparation circuit to the quantum processor to transform the quantum processor from the initial state to a trial state, by the use of the one or more lasers, wherein the trial state preparation circuit comprises the plurality of model Hamiltonian circuits and the plurality of mixing; and measuring an expectation value of the model Hamiltonian on the quantum processor; and a classical computer configured to output the measured expectation value of the model Hamiltonian as an optimized solution to the MaxCut problem.

5. The hybrid quantum-classical computing system according to claim 4, wherein the chaotic map comprises a logistic map.

6. The hybrid quantum-classical computing system according to claim 4, wherein the quantum processor is set in the initial state by setting, by the system controller, each trapped ion in the quantum processor in a lower state of the two frequency-separated states using optical pumping.

7. A hybrid quantum-classical computing system comprising non-transitory non-volatile memory having a number of instructions stored therein which, when executed by one or more processors, causes the hybrid quantum-classical computing system to perform operations comprising:

selecting a maximum-cut (MaxCut) problem to be solved;
executing iterations, each iteration comprising:
setting a quantum processor in an initial state, wherein the quantum processor comprises a plurality of trapped ions, each having two frequency-separated states defining a qubit;

computing a set of first variational parameters and second variational parameters, wherein the set of first variational parameters and second variational parameters is selected randomly in the initial iteration, and updated from the set of first variational parameters and second variational parameters in the previous iteration using a chaotic map that comprises a tuning parameter, wherein the tuning parameter is adjusted to maximize an approximation ratio of an approximate solution relative to the exact solution of the MaxCut problem;

computing a plurality of model Hamiltonian circuits using the selected first variational parameters, and a plurality of mixing circuits using the selected second variational parameters, wherein each of the plurality of model Hamiltonian circuits implements a model Hamiltonian to which a combinatorial optimization the MaxCut problem corresponds;

applying a trial state preparation circuit to the quantum processor to transform the quantum processor from the initial state to a trial state, wherein the trial state preparation circuit comprises the plurality of model Hamiltonian circuits and the plurality of mixing circuits;

measuring an expectation value of the model Hamiltonian on the quantum processor; and outputting the measured expectation value as an optimized solution to the MaxCut problem.

8. The hybrid quantum-classical computing system according to claim 7, wherein the chaotic map comprises a logistic map.

9. The hybrid quantum-classical computing system according to claim 7, wherein the quantum processor is set in the initial state by setting, by a system controller, each trapped ion in the quantum processor in a superposition of the two frequency-separated states.

* * * * *